US012614538B2

(12) United States Patent
Wang

(10) Patent No.: US 12,614,538 B2
(45) Date of Patent: Apr. 28, 2026

(54) AUDIO PLAYBACK METHOD, AUDIO PLAYBACK DEVICE, AND STORAGE MEDIUM

(71) Applicant: GUANGDONG OPPO MOBILE TELECOMMUNICATIONS CORP., LTD., Dongguan (CN)

(72) Inventor: Ze Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 180 days.

(21) Appl. No.: 18/496,836

(22) Filed: Oct. 27, 2023

(65) Prior Publication Data

US 2024/0127786 A1 Apr. 18, 2024

Related U.S. Application Data

(63) Continuation of application No. PCT/CN2022/083707, filed on Mar. 29, 2022.

(30) Foreign Application Priority Data

Apr. 29, 2021 (CN) ......................... 202110475260.4

(51) Int. Cl.

| | |
|---|---|
| ***H04R 1/10*** | (2026.01) |
| ***G10K 11/178*** | (2006.01) |
| ***H04R 3/00*** | (2006.01) |

(52) U.S. Cl.

CPC ..... *G10K 11/17853* (2018.01); *H04R 1/1083* (2013.01); *H04R 3/002* (2013.01); *G10K 2210/1081* (2013.01)

(58) Field of Classification Search

CPC ..... G10K 11/17853; G10K 2210/1081; G10K 11/17885; H04R 1/1083; H04R 3/002; H04R 1/10; H04R 2410/05

(Continued)

(56) References Cited

U.S. PATENT DOCUMENTS 4,496,021 A * 1/1985 Berlant ................ G10K 11/025 181/152
4,953,217 A 8/1990 Overseas (Continued)

FOREIGN PATENT DOCUMENTS

CN 101001481 A 7/2007
CN 107071654 A 8/2017

(Continued)

OTHER PUBLICATIONS

First Chinese Office Action and search report from Chinese Application No. 202110475260.4, mailed Apr. 11, 2024 with English translation.

(Continued)

*Primary Examiner* — Carolyn R Edwards
*Assistant Examiner* — Friedrich Fahnert
(74) *Attorney, Agent, or Firm* — Ladas & Parry, LLP

(57) ABSTRACT

The present disclosure discloses an audio playback method, an audio playback device, a computer-readable storage medium. The audio playback method includes: obtaining a noise signal; obtaining a noise canceling signal by performing a noise reduction process on the noise signal; and playing a low-frequency portion of the noise canceling signal through a first speaker.

16 Claims, 6 Drawing Sheets

(58) Field of Classification Search
USPC .......................................................... 381/71.6
See application file for complete search history.

(56) References Cited

U.S. PATENT DOCUMENTS

| | | | | |
|---|---|---|---|---|
| 2004/0191275 | A1* | 9/2004 | Milner | B01F 31/87 241/1 |
| 2014/0270222 | A1* | 9/2014 | Hendrix | G10K 11/17885 381/71.6 |
| 2016/0316297 | A1 | 10/2016 | Yang et al. | |
| 2016/0330546 | A1* | 11/2016 | Barrentine | G10K 11/17857 |
| 2017/0064434 | A1* | 3/2017 | Campbell | H04R 1/1091 |
| 2019/0130930 | A1 | 5/2019 | Tong et al. | |
| 2022/0383848 | A1* | 12/2022 | Darlington | H04R 1/1083 |

FOREIGN PATENT DOCUMENTS

| | | | |
|---|---|---|---|
| CN | 107750027 | A | 3/2018 |
| CN | 110099323 | A | 8/2019 |
| CN | 110996215 | A | 4/2020 |
| CN | 111134956 | A | 5/2020 |
| JP | 2002055684 | A | 2/2002 |
| TW | 200828264 | A | 7/2008 |
| WO | 2022227992 | A1 | 3/2022 |

OTHER PUBLICATIONS

Second Office Action for Chinese Patent Application No. 202110475260.4 issued on Oct. 8, 2024.

Chinese Rejection decision for Chinese Patent Application No. 202110475260.4 issued on Nov. 28, 2024.

International Search Report, International Application No. PCT/CN2022/083707, mailed Jun. 21, 2022 (14 pages).

Written Opinion of the International Searching Authority in International Application No. PCT/CN2022/083707, mailed Jun. 21, 2022, with machine English translation provided by WIPO and by applicant's foreign counsel.

* cited by examiner

AUDIO PLAYBACK METHOD, AUDIO PLAYBACK DEVICE, AND STORAGE MEDIUM

CROSS-REFERENCE TO RELATED APPLICATIONS

The present disclosure is a continuation-application of International (PCT) Patent Application No. PCT/CN2022/083707, filed on Mar. 29, 2022, which claims priority of China Patent Applicant No. 202110475260.4, filed on Apr. 29, 2021, in the title of "AUDIO PLAYBACK METHOD AND AUDIO PLAYBACK DEVICE", the entire contents of which are hereby incorporated by reference in their entirety.

TECHNICAL FIELD

The present disclosure relates to the field of noise reduction technologies, and in particular to an audio playback method, an audio playback device, and a storage medium.

BACKGROUND

With the development of noise cancellation technology, the user's requirements for noise cancellation of earphones are getting higher and higher. Therefore, earphones are not only required to have good noise cancellation effect, but also to ensure the sound quality of the audio signal played. In the related art, active noise cancellation (ANC) earphones generate inverted sound waves corresponding to external noise through a noise cancellation module set inside the earphones, for neutralizing the external noise and obtaining a denoised audio signal.

However, users often find that the noise floor of the earphones when the ANC function is turned on and no audio is played is more obvious than when the ANC function is turned off.

SUMMARY OF THE DISCLOSURE

In view of this, the present disclosure provides an audio playback method, an audio playback device, and a storage medium.

An audio playback method, including: obtaining a noise signal; obtaining a noise canceling signal by performing a noise reduction process on the noise signal; and playing a low-frequency portion of the noise canceling signal through a first speaker.

An audio playback device, including: an obtaining circuit, a noise reduction circuit, and a low-frequency output circuit; wherein the low-frequency output circuit includes a first speaker; the obtaining circuit is configured to obtain a noise signal; the noise reduction circuit is configured to obtain a noise canceling signal by performing a noise reduction process on the noise signal; and the low-frequency output circuit is configured to play a low-frequency portion of the noise canceling signal through the first speaker.

A non-transitory computer-readable storage medium, storing an instruction; wherein the instruction is executable by a processor to perform: obtaining a noise signal; obtaining a noise canceling signal by performing a noise reduction process on the noise signal; and playing a low-frequency portion of the noise canceling signal through a first speaker.

BRIEF DESCRIPTION OF THE DRAWINGS

In order to more clearly illustrate the technical solutions in the embodiments or related art of the present disclosure, the accompanying drawings to be used in the description of the embodiments or related art will be briefly introduced below, and it will be obvious that the accompanying drawings in the following description are only embodiments of the present disclosure, and that, for those skilled in the art, other accompanying drawings can be obtained based on the disclosed accompanying drawings without putting in creative labor.

Figure 1:
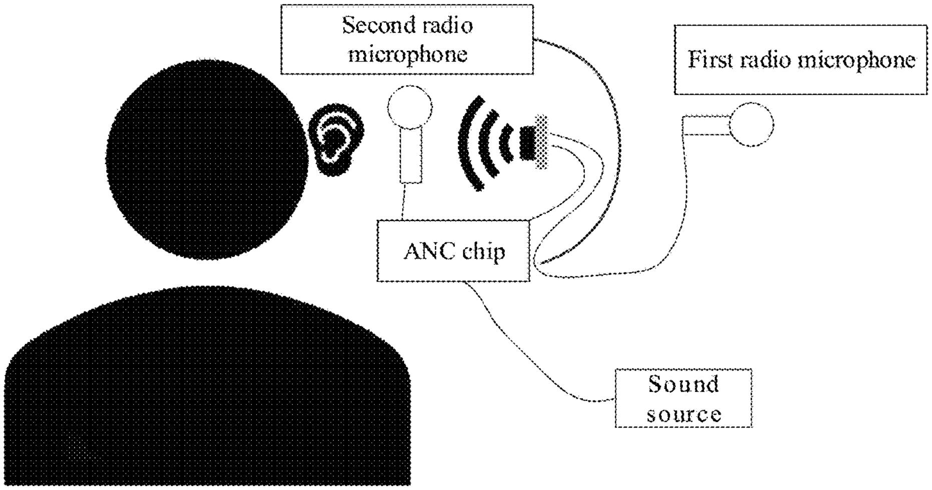
FIG. 1 is a schematic view of an application environment of an audio playback method according to an embodiment of the present disclosure.

REFERENCE NUMERALS first speaker, 10; first filter, 20; first active noise reduction filter, 30; first dynamic voltage limiter, 40; second active noise reduction filter, 50; second dynamic voltage limiter, 60; second speaker, 70; equalizer, 80.

DETAILED DESCRIPTION

The technical solutions in the embodiments of the present disclosure will be described clearly and completely in the following in conjunction with the accompanying drawings in the embodiments of the present disclosure, and it is obvious that the described embodiments are only a part of the embodiments of the present disclosure and not all of the embodiments. Based on the embodiments in the present disclosure, all other embodiments obtained by those skilled in the art without making creative labor fall within the scope of the present disclosure.

The audio playback method provided in the present disclosure may be applied in an application environment as illustrated in FIG. 1. An earphone receives an audio signal sent by an external audio device or obtains an audio signal stored internally in the earphone, and converts the audio signal into another audio signal that can be heard by a user through a speaker close to an ear. Exemplarily, a feedforward earphone may include a first radio microphone as illustrated in FIG. 1, a feedback earphone may include a second radio microphone close to the ear canal as illustrated in FIG. 1, and a hybrid earphone may include the first radio microphone and the second radio microphone as illustrated in FIG. 1.

An external ambient noise signal may cause interference to the played audio signal during the usage of the earphone, and an active noise reduction method in the related art mainly generates an inverted sound wave corresponding to the external noise by means of a noise reduction module arranged inside the earphone, for neutralizing the external noise and obtaining a denoised audio signal. The low-frequency portion of the noise signal has a long wavelength and can withstand some phase delay, while the high-frequency portion of the noise signal has a short wavelength and is sensitive to phase deviation. Therefore, for the conventional active noise reduction method, the noise reduction module is used to generate a noise canceling signal having an inverted sound wave corresponding to the external noise to neutralize the external noise, and the effect the noise reduction treatment on the high-frequency portion of the noise signal is not obvious. In addition, the conventional active noise reduction method uses a full-band speaker to play the noise canceling signal, such that the high-frequency portion of the noise canceling signal is replayed, and the high-frequency replay leads to an increase in the noise floor of the earphone. Especially when the active noise reduction function of the earphone is turned on and the audio signal is not played, and the noise floor of the earphone is more obvious than when the active noise reduction function is turned off. Therefore, there is a need to provide an audio playback method and an audio playback device that can ensure high sound quality of an audio signal while mitigating the problem of increased noise floor.

Figure 2:
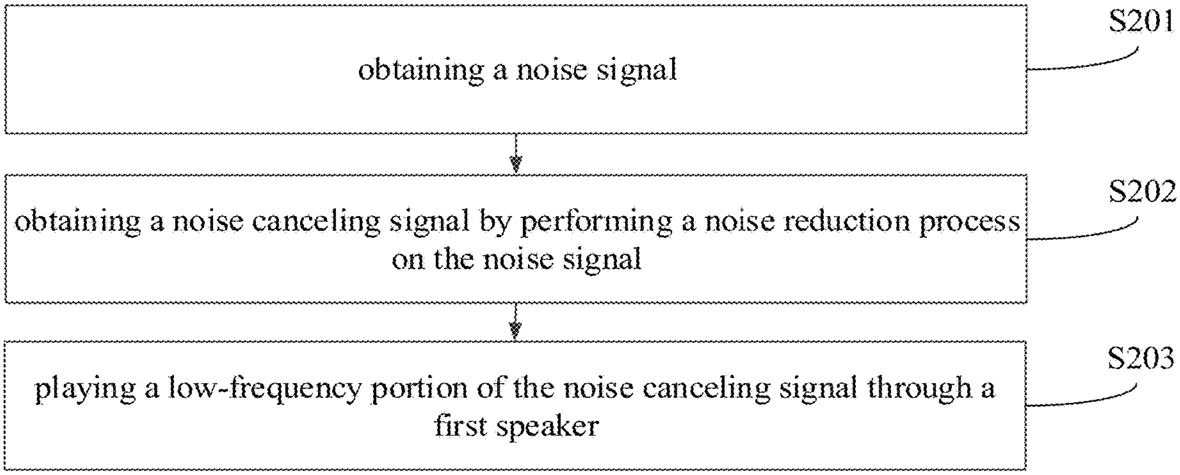
FIG. 2 is a flowchart of an audio playback method according to an embodiment of the present disclosure.

Therefore, in order to solve the above problem, in some embodiments, referring to FIG. 2, an audio playback method is provided, which is illustrated as an example of the method being applied to the earphone in FIG. 1. The method includes the following operations at blocks illustrated herein.

At block S201: obtaining a noise signal.

Usually, in a case of usage of an audio playback device, such as an earphone or a head-mounted audio playback device, the noise signal during the operation of the audio playback device may affect the sound quality experience of the played audio signal, for example, the noise signal may include an external ambient noise signal and a residual noise signal coupled into the ear canal, etc. Therefore, there is a need to perform a noise reduction process on the noise signals to improve the sound quality of the audio signal played by the audio playback device. In some embodiments, in a case where the noise signal obtained by the audio playback device is an external ambient noise signal, the noise signal may be obtained by a feedforward obtaining unit external to the audio playback device. In some embodiments, in a case where the noise signal obtained by the audio playback device includes an external ambient noise signal and a residual noise signal within the audio playback device, the external ambient noise signal may be obtained by a feedforward obtaining unit external to the audio playback device, and the residual noise signal within the audio playback device may be obtained by a feedback obtaining unit internal to the audio playback device.

At block S202: obtaining a noise canceling signal by performing a noise reduction process on the noise signal.

In the embodiments, the audio playback device performs the noise reduction process on the obtained noise signal to obtain the noise canceling signal. Exemplarily, when the obtained noise signal is an ambient noise signal, the audio playback device performs the noise reduction process on the ambient noise signal to obtain the noise canceling signal; when the obtained noise signal includes an ambient noise signal and a residual noise signal, the audio playback device needs to perform the noise reduction process on both the ambient noise signal and the residual noise signal to obtain the noise canceling signal. In some embodiments, the noise reduction process performed by the audio playback device on the noise signal may be to generate a sound wave with the same amplitude and frequency and opposite phase as the noise signal to obtain the noise canceling signal, or the audio playback device may invert the noise signal to obtain the noise canceling signal; or, the audio playback device may further suppress the amplitude of the inverted signal after generating the corresponding inverted signal according to the noise signal, etc., which is not limited in the embodiments of the present disclosure.

At block S203: playing a low-frequency portion of the noise canceling signal through a first speaker.

Usually, a signal with a frequency of less than 1 KHz is referred to as a low-frequency signal, and it should be noted that the signal of less than 1 KHz is referred to as a low-frequency signal as an example of the low-frequency portion in the present embodiments, and the division of the low-frequency signal in the embodiments of the present disclosure is not limited in this manner. For example, in the embodiments, the low-frequency portion of the noise canceling signal played by the first speaker may be a portion of the noise canceling signal with a frequency of less than 1 KHz as described above. In some embodiments, the first speaker may be a bass speaker, and the playing the low-frequency portion of the noise canceling signal through the bass speaker may be causing the first speaker to play the low-frequency portion of the noise canceling signal by setting device characteristics of the first speaker, or, may be arranging a filter inside the first speaker, obtaining a low-frequency portion by the built-in filter filtering the noise canceling signal, and playing the low-frequency portion of the noise canceling signal through the first speaker. In some embodiments, the first speaker may be any one of an electrically operated speaker, an electrostatic speaker, an electromagnetic speaker, and a piezoelectric speaker.

In the above audio playback method, a noise canceling signal is obtained by performing a noise reduction process on an obtained noise signal, and a low-frequency portion of the noise canceling signal is played through a first speaker. The low-frequency portion of the played noise canceling signal is able to cancel out the low-frequency portion of the noise signal. The first speaker does not play a high-frequency portion of the noise canceling signal. Compared to a conventional technology in which a full-band speaker is used to play the noise canceling signal, the audio playback method of the embodiments of the present disclosure may not lead to situations in which a high-frequency signal of a non-noise reduction frequency band is replayed, because the first speaker plays the low-frequency portion of the noise canceling signal. Particularly, when the ANC function is turned on and no audio is being played, the method may avoid high-frequency noise caused by replaying the high-frequency portion of the noise canceling signal, thereby further reducing the noise floor of the audio playback device.

In the above scenario of playing the low-frequency portion of the noise canceling signal through the first speaker, the low-frequency portion of the noise canceling signal may be obtained by filtering the noise canceling signal, and the low-frequency portion of the noise canceling signal may be played through the first speaker; or the low-frequency portion of the noise canceling signal may be played through device characteristics of the first speaker. The two methods will be explained in detail below, respectively.

Scenario 1: Step S203 includes: obtaining the low-frequency portion of the noise canceling signal by filtering the noise canceling signal, and playing the low-frequency portion of the noise canceling signal through the first speaker.

In the embodiments, the audio playback device first filters the noise canceling signal to obtain the low-frequency portion of the noise canceling signal, and then plays the low-frequency portion of the obtained noise canceling signal through the first speaker. For example, a filter may be provided before the first speaker, the low-frequency portion of the noise canceling signal is obtained by filtering the noise canceling signal through the filter, and the low-frequency portion of the noise canceling signal is played by the first speaker. In some embodiments, the low-frequency portion of the noise canceling signal obtained by filtering the noise canceling signal by the audio playback device may be a signal with a frequency of less than 1 KHz in the noise canceling signal.

In the embodiments, the low-frequency portion of the noise canceling signal can be obtained by filtering the noise canceling signal, such that the low-frequency portion of the noise canceling signal can be directly played through the first speaker, which is a relatively simple process to realize. In addition, the low-frequency portion of the noise canceling signal is obtained by filtering the noise canceling signal, and the same low-frequency portion of the noise canceling signal is played through the first speaker, such that the noise replay of a high-frequency signal in a non-noise reduction frequency band is avoided.

Scenario II, Step S203 includes: playing the low-frequency portion of the noise canceling signal through device characteristics of the first speaker, where the device characteristics of the first speaker are configured to cause the first speaker to meet a preset low-frequency output condition.

In the embodiments, the audio playback device plays the low-frequency portion of the noise canceling signal through the device characteristics of the first speaker, where the device characteristics of the first speaker cause the first speaker to meet the preset low-frequency output condition. In some embodiments, the preset low-frequency output condition includes that a frequency band of an output signal of the first speaker lies within a preset low-frequency band, and generally, a signal with a frequency of less than 1 KHz is referred to as a low-frequency signal.

In some scenarios, the first speaker may also play a mid-frequency portion of the noise canceling signal when playing the low-frequency portion of the noise canceling signal, and generally, a signal with a frequency of 1-6 KHz may be referred to as a mid-frequency signal. Accordingly, the preset low-frequency output condition may further include that the output signal of the first speaker has a characteristic of a high low-frequency amplitude and a flat mid-frequency amplitude.

In some embodiments, the preset low-frequency output condition further includes that an acoustic pressure change amount of the output signal of the first speaker is less than a preset threshold value, where the acoustic pressure change amount of the output signal of the first speaker is a change amount of the atmospheric pressure generated after being perturbed by the output signal of the first speaker. In some embodiments, the device characteristics of the first speaker include acoustic resistance characteristics of a horn acoustic aperture tuning network and/or damping characteristics of a diaphragm material of the first speaker. In the case of earphone, for example, the acoustic resistance characteristics of the horn acoustic aperture tuning network of the first speaker of the earphone may be adjusted to make the preset low-frequency output condition met, thereby allowing the first speaker to play a low-frequency signal or a low-medium frequency signal; or, the damping characteristics of the diaphragm material of the first speaker of the earphone may be adjusted to make the preset low-frequency output condition met, thereby allowing the first speaker to play a low-frequency signal or a low-medium frequency signal; or, the acoustic resistance characteristics of the horn acoustic aperture tuning network and/or the damping characteristics of the diaphragm material of the first speaker may be simultaneously adjusted to make the preset low-frequency output condition met, thereby allowing the first speaker to play a low-frequency signal or a low-medium frequency signal; or, other device characteristics of the first speaker of the earphone may be adjusted, which is not limited in the embodiments of the present disclosure.

It should be noted that a signal with a frequency of less than 1 KHz is referred to as a low-frequency signal, and a signal with a frequency of between 1 KHz and 6 KHz is referred to as a mid-frequency signal, which is only intended to exemplify the low-frequency signal, the mid-frequency signal, and the range of low-frequency band in the embodiments of the present disclosure, and is not a limitation of the embodiments of the present disclosure.

In the embodiments, the audio playback device plays the low-frequency portion of the noise canceling signal through the device characteristics of the first speaker, and the device characteristics of the first speaker can enable the first speaker to meet the preset low-frequency output condition, such that the low-frequency portion of the noise canceling signal can be played through the device characteristics of the first speaker, and there is no need to design other filters in the audio playback device, which simplifies the circuit cost of the audio playback device. In addition, playing the low-frequency portion of the noise canceling signal through the device characteristics of the first speaker may avoid noise replay of the high-frequency signal in the non-noise reduction frequency band.

As in the foregoing description of the scenarios, for the feedforward earphone and the hybrid earphone, the obtained noise signal may include an ambient noise signal. In some embodiments, Step S202 includes: obtaining the noise canceling signal by performing a noise reduction process on the ambient noise signal.

In the embodiments, the audio playback device performs the noise reduction process on the obtained ambient noise signal to obtain the noise canceling signal. In some embodiments, the noise reduction process performed by the audio playback device on the noise signal may be to directly generate a sound wave with the same amplitude and frequency and opposite phase as the ambient noise signal to obtain the noise canceling signal, or to invert the ambient noise signal to obtain the noise canceling signal.

In the embodiments, the audio playback device performs the noise reduction process on the obtained ambient noise signal to obtain the noise canceling signal, through which the ambient noise signal may be cancelled out, thereby improving the noise reduction effect of the audio playback device, and ensuring the sound quality of the played audio signal.

As in the foregoing description of the scenarios, for the hybrid earphone, the obtained noise signal may include a residual noise signal. In some embodiments, Step S202 includes: obtaining the noise canceling signal by performing a noise reduction process on the ambient noise signal and the residual noise signal.

In the embodiments, the audio playback device performs the noise reduction process on the obtained ambient noise signal and the residual noise signal to obtain the noise canceling signal. In some embodiments, the audio playback device may perform the noise reduction process on the ambient noise signal and the residual noise signal separately, for example, inverting the ambient noise signal to obtain a noise canceling signal with an opposite phase as the ambient noise signal, and inverting the residual noise signal to obtain a noise canceling signal with an opposite phase as the residual noise signal.

Further, an inverted ambient noise signal and an inverted residual noise signal may be obtained after the inverting process on the ambient noise signal and the residual noise signal, and the amplitude of the inverted ambient noise signal and the inverted residual noise signal may be suppressed to obtain the noise canceling signal. For example, the amplitude of the inverted ambient noise signal is compressed to within a preset first amplitude range, and the amplitude of the residual noise signal is compressed to within a preset second amplitude range.

In the embodiments, the audio playback device performs the noise reduction process on the ambient noise signal and the residual noise signal to obtain the noise canceling signal, through which both the ambient noise signal from the outside and the residual noise signal in the ear canal may be cancelled out, thereby further reducing the noise floor of the audio playback device.

Further, in the embodiments, when the audio playback device is playing an audio signal, the residual noise signal is obtained while the audio signal in the ear canal is also obtained. For example, when the residual noise signal is obtained by a pickup set, of the audio playback device, near the ear canal while the audio signal in the ear canal is also obtained, the noise reduction on the audio signal in the ear canal is also required to ensure the sound quality of the played audio signal. For example, the following steps may be performed to perform the noise reduction on the audio signal in the ear canal.

S1, obtaining an inverted audio signal by performing an inverting process on the audio signal in the ear canal. The inverted audio signal of the audio signal in the ear canal is a signal that has an opposite phase as the obtained audio signal in the ear canal. In the embodiments, the audio playback device may invert the obtained audio signal in the ear canal to obtain the inverted audio signal. In some embodiments, the audio playback device may invert the obtained audio signal in the ear canal by means of an active noise reduction filter to obtain the inverted audio signal, or may generate the inverted audio signal according to characteristics of the audio signal in the ear canal such as frequency and amplitude change.

S2, superimposing an audio signal to be played with the inverted audio signal to eliminate the obtained audio signal in the ear canal. It is to be understood that the above inverted audio signal is an audio signal having a phase opposite to that of the audio signal to be played. Therefore, by superimposing the audio signal to be played with the inverted audio signal, the audio signal in the ear canal can be eliminated.

In the embodiments, the audio playback device may obtain an inverted audio signal having a phase opposite to that of the audio signal in the ear canal by inverting the obtained audio signal in the ear canal, and may superimpose the audio signal to be played with the inverted audio signal, thereby eliminating the obtained audio signal in the ear canal, so as to ensure the sound quality of the played audio signal.

Figure 3:
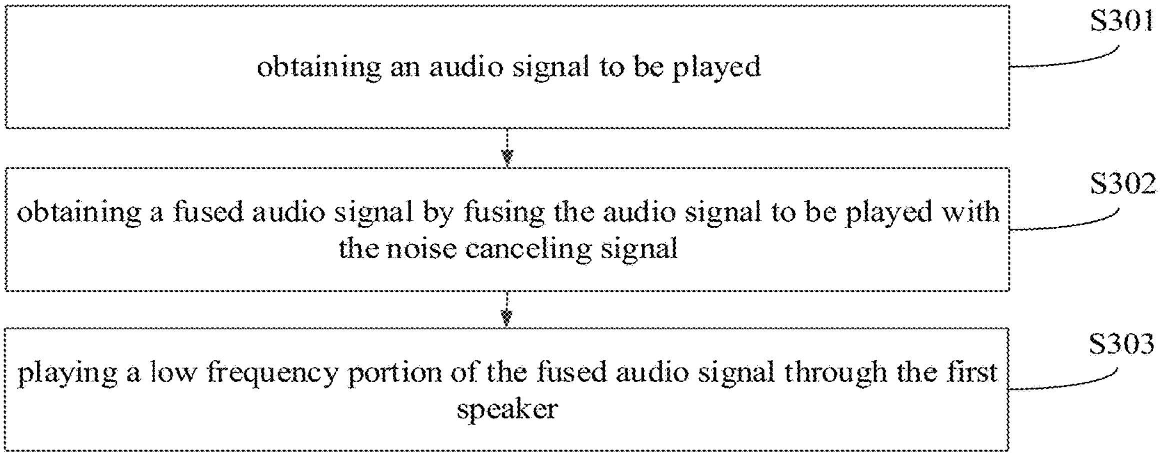
FIG. 3 is a flowchart of an audio playback method according to an embodiment of the present disclosure.

In most scenarios, the audio playback device is required to play the audio signal, and when the audio playback device has an audio signal to be played, the audio playback device may fuse the audio signal to be played and the obtained noise canceling signal to obtain a fused audio signal, and play a low-frequency portion of the fused audio signal through the first speaker. In some embodiments, as illustrated in FIG. 3, the above method further includes operations at blocks.

At block S301: obtaining an audio signal to be played.

It is understood that when the audio signal is played by the audio playback device, the audio playback device may first obtain the audio signal to be played. In some embodiments, the audio playback device may obtain the audio signal to be played through a pickup set. The audio signal to be played may be pre-stored in a memory of the audio playback device, or may be obtained from another external audio device, for example, the external audio device may be a speaker, a mobile phone, a television, a computer, a sound card, etc. In some embodiments, the audio signal to be played may be a music signal, a voice signal, other audio signals, etc., and the embodiments is not limited thereto.

At block S302: obtaining a fused audio signal by fusing the audio signal to be played with the noise canceling signal.

In the embodiments, after the audio playback device obtains the audio signal to be played, the audio playback device fuses the obtained audio signal to be played with the noise canceling signal to obtain the fused audio signal. In some embodiments, the audio playback device may superimpose the audio signal to be played and the noise canceling signal by means of a preset fuser to obtain the fused audio signal.

At block S303: playing a low frequency portion of the fused audio signal through the first speaker.

In the embodiments, the audio playback device plays the low-frequency portion of the fused audio signal through the first speaker. In some embodiments, the audio playback device may filter the fused audio signal to obtain the low-frequency portion of the fused audio signal, and play the low-frequency portion of the fused audio signal through the first speaker. In some embodiments, the audio playback device may play the low-frequency portion of the noise canceling signal through the device characteristics of the first speaker, where the device characteristics of the first speaker cause the first speaker to meet a preset low-frequency output condition. In some embodiments, the preset low-frequency output condition includes that a frequency band of an output signal of the first speaker lies within a preset low-frequency band and that the output signal of the first speaker has characteristics of a high low-frequency amplitude and a flat mid-frequency amplitude. In some embodiments, the low-frequency output condition further includes that an acoustic pressure change amount of the output signal of the first speaker is less than a preset threshold value. In some embodiments, the device characteristics of the first speaker include acoustic resistance characteristics of a horn acoustic aperture tuning network and/or damping characteristics of a diaphragm material of the first speaker. It is to be noted that for a detailed description of the preset low-frequency output condition met by the first speaker and a detailed description of the device characteristics of the first speaker, reference may be made to the description of the above embodiments, and the present embodiments will not be repeated herein.

In the embodiments, when an audio signal to be played exists within the audio playback device, the audio playback device obtains the audio signal to be played, fuses the audio signal to be played with the noise canceling signal to obtain the fused audio signal, and plays the low-frequency portion of the fused audio signal through the first speaker, so as to take into account the sound quality of the audio signal to be played while noise canceling the noisy signal, thereby ensuring the playback of the high-quality audio signal.

In a scenario where the audio signal to be played exists within the audio playback device, a gain value of the audio signal to be played may be adjusted. In some embodiments, the method further includes: performing a gain adjustment on the audio signal to be played.

In the embodiments, the audio playback device may adjust the gain of the audio signal to be played before playing the audio signal to be played. In some embodiments, the audio playback device may adjust the gain of the audio signal to be played by means of an equalizer. It is to be understood that by adjusting the gain of the audio signal to be played, the playback sound quality of the audio signal to be played may be improved through adjusting electrical signals of various different frequencies.

In the scenario in which the low-frequency portion of the fused audio signal is played through the first speaker, a high-frequency portion of the audio signal to be played may also be played in order to ensure the integrity of the audio signal. On the basis of the above embodiments, in some embodiments, the method further includes: playing a high-frequency portion of the audio signal to be played through a second speaker.

In the embodiments, the audio playback device plays the high-frequency portion of the audio signal to be played through the second speaker. In some embodiments, the second speaker may be a tweeter. In some embodiments, the second speaker may be any one of an electrically operated speaker, an electrostatic speaker, an electromagnetic speaker, and a piezoelectric speaker. Generally, a signal with a frequency between 6 KHz and 20 KHz may be referred to as a high-frequency signal. In the embodiments, the high-frequency portion of the audio signal to be played that is played through the second speaker may be a portion of the audio signal to be played with a frequency between 6 KHz and 20 KHz. It is to be noted that naming the signal with a frequency between 6 KHz-20 KHz as the high-frequency signal is to exemplify the signal of the high-frequency portion of the audio signal to be played in the embodiments, and the division of the high-frequency signal in the embodiments of the present disclosure is not limited thereto. In some embodiments, an acoustic pressure of an output signal of the second speaker is higher than an acoustic pressure of an output signal of the first speaker. That is, a change amount of the atmospheric pressure generated after being perturbed by the output signal of the second speaker is greater than a change amount of the atmospheric pressure generated after being perturbed by the output signal of the first speaker.

In some embodiments, playing the high-frequency portion of the audio signal to be played through the second speaker may be performed in two ways.

In Mode I, the audio signal to be played is filtered to obtain the high-frequency portion of the audio signal to be played, and the high-frequency portion of the audio signal to be played is played through the second speaker.

In the embodiments, the audio playback device filters the audio signal to be played to obtain the high-frequency portion of the audio signal to be played, and plays the high-frequency portion of the audio signal to be played through the second speaker. For example, a filter may be provided before the second speaker, and the high-frequency portion of the audio signal to be played may be filtered by the filter to obtain the high-frequency portion of the audio signal to be played, and the high-frequency portion of the audio signal to be played may be played by the second speaker. In some embodiments, the high-frequency portion of the audio signal to be played, obtained by filtering the audio signal to be played by the audio playback device, may be a signal with a frequency between 6 KHz and 20 KHz in the audio signal to be played.

In Mode II, the high-frequency portion of the audio signal to be played is played through device characteristics of the second speaker, and the device characteristics of the second speaker cause the second speaker to meet a preset high-frequency output condition.

In the embodiments, the audio playback device plays the high-frequency portion of the audio signal to be played through the device characteristics of the second speaker, where the device characteristics of the second speaker cause the second speaker to meet the preset high-frequency output condition. In some embodiments, the preset high-frequency output condition includes that a frequency band of an output signal of the second speaker lies within a preset high-frequency band range, and generally, a signal with a frequency between 6 KHz and 20 KHz is referred to as a high-frequency signal. In some embodiments, the device characteristics of the second speaker include at least one of a type of a diaphragm material, a Young's modulus of the diaphragm material, damping characteristics of the diaphragm material, a mass of a vibration system of the speaker, and a coil size of the speaker. In the case of the earphone, for example, the type of the diaphragm material of the second speaker of the earphone may be adjusted to make the preset high-frequency output condition met, so as to allow the second speaker to play the high-frequency signal of the audio signal to be played; or, the Young's modulus of the diaphragm material of the second speaker of the earphone may be adjusted to make the preset high-frequency output condition met, so as to allow the second speaker to play the high-frequency signal of the audio signal to be played; or, the damping characteristics of the diaphragm material of the second speaker of the earphone may be adjusted to make the preset high-frequency output condition met, so as to allow the second speaker to play the high-frequency signal of the audio signal to be played; or, the mass of the vibration system of the second speaker of the earphone may be adjusted s to make the preset high-frequency output condition met, so as to allow the second speaker to play the high-frequency signal of the audio signal to be played; or, the coil size of the second speaker of the earphone may be adjusted to make the preset high-frequency output condition met, so as to allow the second speaker to play the high-frequency signal of the audio signal to be played; or, more than one of the type of the diaphragm material, the Young's modulus of the diaphragm material, the damping characteristics of the diaphragm material, the mass of the vibration system of the speaker, and the coil size of the speaker may be simultaneously adjusted to allow the second speaker to play the high-frequency signal of the audio signal to be played; or, other device characteristics of the second speaker of the earphone may be adjusted, without being limited in the embodiments of the present disclosure.

In the embodiments, the audio playback device plays the high-frequency portion of the audio signal to be played through the second speaker, and plays the low-frequency portion of the audio signal to be played separately from the high-frequency portion of the audio signal to be played, such that the high-frequency portion of the audio signal to be played, played by the audio playback device, does not have the noise of the high-frequency signal of the non-noise reduction frequency band, thereby ensuring the sound quality of playback of the audio signal to be played; furthermore, playing the high-frequency portion of the audio signal to be played through the second speaker of the audio playback device ensures the integrity of the audio signal to be played.

It should be understood that although the individual steps in the flowcharts of FIGS. 2-3 are illustrated sequentially as indicated by the arrows, these steps are not necessarily executed sequentially in the order indicated by the arrows. Unless expressly stated herein, there is no strict order limitation on the execution of these steps, and the steps may be executed in other orders. Moreover, at least a portion of the steps in FIGS. 2-3 may include multiple steps or multiple stages, which are not necessarily executed to completion at the same moment, but may be executed at different moments, and the order in which these steps or stages are executed is not necessarily sequential, but may be executed in turn or alternately with other steps or at least a portion of steps or stages in other steps.

Figure 4:
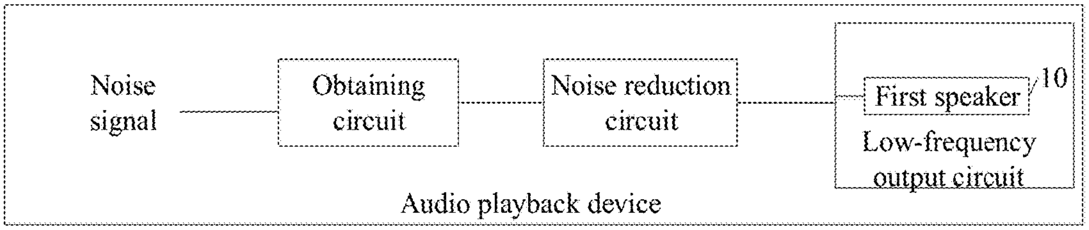
FIG. 4 is a schematic view of an audio playback device according to an embodiment of the present disclosure.

In some embodiments, as illustrated in FIG. 4, provided is an audio playback device including an obtaining circuit, a noise reduction circuit, and a low-frequency output circuit, and the low-frequency output circuit includes a first speaker; where the obtaining circuit is configured to obtain a noise signal; the noise reduction circuit is configured to obtain a noise canceling signal by performing a noise reduction process on the noise signal; and the low-frequency output circuit is configured to play a low-frequency portion of the noise canceling signal through a first speaker.

The audio playback device may be an earphone. Usually, in a case of usage of an earphone or a head-mounted audio playback device, the noise signal during the operation of the audio playback device may affect the sound quality experience of the played audio signal, for example, the noise signal may include an external ambient noise signal and a residual noise signal coupled into the ear canal, etc. Therefore, there is a need to perform a noise cancellation process on the noise signals to improve the sound quality of the audio signal played by the audio playback device.

In some embodiments, the noise signal obtained by the obtaining circuit of the audio playback device may be an external ambient noise signal, a residual noise signal within the audio playback device, or an external ambient noise signal and a residual noise signal within the audio playback device. Exemplarily, when the noise signal obtained by the obtaining circuit is an external ambient noise signal, the noise reduction circuit performs the noise reduction process on the external ambient noise signal to obtain the noise canceling signal; the noise signal obtained by the obtaining circuit includes an external ambient noise signal and a residual noise signal, the noise reduction circuit is required to perform the noise reduction process on both the external ambient noise signal and the residual noise signal to obtain the noise canceling signal. In some embodiments, the noise reduction process performed by the noise reduction circuit on the noise signal obtained as described above may be to generate a sound wave with the same amplitude and frequency and opposite phase as the noise signal to obtain the noise canceling signal to obtain the noise canceling signal, or the audio playback device may invert the noise signal to obtain the noise canceling signal; or, the audio playback device may further suppress the amplitude of the inverted signal after generating the corresponding inverted signal according to the noise signal, etc., which is not limited in the embodiments of the present disclosure. Generally, a signal with a frequency of less than 1 KHz is referred to as a low-frequency signal, and it should be noted that the signal of less than 1 KHz is referred to as a low-frequency signal as an example of the low-frequency portion in the present embodiments, and the division of the low-frequency signal in the embodiments of the present disclosure is not limited in this manner. For example, in the embodiments, the low-frequency portion of the low-frequency output circuit played by the noise canceling signal through the first speaker may be a portion of the noise canceling signal with a frequency of less than 1 KHz.

In the audio playback device, the obtaining circuit obtains the noise signal, the noise reduction circuit performs the noise reduction process on the noise signal to obtain the noise canceling signal, and the low-frequency portion of the noise canceling signal is played through the first speaker of the low-frequency output circuit. The low-frequency portion of the played noise canceling signal is able to cancel out the low-frequency portion of the noise signal. The first speaker does not play a high-frequency portion of the noise canceling signal. Compared to a conventional technology in which a full-band speaker is used to play the noise canceling signal, the audio playback method of the embodiments of the present disclosure may not lead to situations in which a high-frequency signal of a non-noise reduction frequency band is replayed, because the first speaker plays the low-frequency portion of the noise canceling signal. Particularly, when the ANC function is turned on and no audio is being played, the method may avoid high-frequency noise caused by replaying the high-frequency portion of the noise canceling signal, thereby further reducing the noise floor of the audio playback device.

In the above scenario of playing the low-frequency portion of the noise canceling signal through the noise canceling signal, the low-frequency output circuit may first filter the noise canceling signal to obtain the low-frequency portion of the noise canceling signal, and then play the low-frequency portion of the noise canceling signal through the first speaker; or the low-frequency portion of the noise canceling signal may be played through device characteristics of the first speaker. The two methods will be explained in detail below, respectively.

In some embodiments, continuing to refer to FIG. 4, the low-frequency output circuit is configured to play the low-frequency portion of the noise canceling signal through device characteristics of the first speaker, and the device characteristics of the first speaker cause the first speaker to meet a preset low-frequency output condition.

In the embodiments, the low-frequency output circuit is configured to play the low-frequency portion of the noise canceling signal through the device characteristics of the first speaker, where the device characteristics of the first speaker cause the first speaker to meet the preset low-frequency output condition. In some embodiments, the preset low-frequency output condition includes that a frequency band of an output signal of the first speaker lies within a preset low-frequency band, and generally, a signal with a frequency of less than 1 KHz is referred to as a low-frequency signal.

In some scenarios, the first speaker may also play a mid-frequency portion of the noise canceling signal when playing the low-frequency portion of the noise canceling signal, and generally, a signal with a frequency of 1-6 KHz may be referred to as a mid-frequency signal. Accordingly, the preset low-frequency output condition may further include that the output signal of the first speaker has a characteristic of a high low-frequency amplitude and a flat mid-frequency amplitude.

In some embodiments, the preset low-frequency output condition further includes that an acoustic pressure change amount of the output signal of the first speaker is less than a preset threshold value, where the acoustic pressure change amount of the output signal of the first speaker is a change amount of the atmospheric pressure generated after being perturbed by the output signal of the first speaker. In some embodiments, the device characteristics of the first speaker include acoustic resistance characteristics of a horn acoustic aperture tuning network and/or damping characteristics of a diaphragm material of the first speaker. In the case of earphone, for example, the acoustic resistance characteristics of the horn acoustic aperture tuning network of the first speaker of the earphone may be adjusted to make the preset low-frequency output condition met, thereby allowing the first speaker to play a low-frequency signal or a low-medium frequency signal; or, the damping characteristics of the diaphragm material of the first speaker of the earphone may be adjusted to make the preset low-frequency output condition met, thereby allowing the first speaker to play a low-frequency signal or a low-medium frequency signal; or, the acoustic resistance characteristics of the horn acoustic aperture tuning network and/or the damping characteristics of the diaphragm material of the first speaker may be simultaneously adjusted to make the preset low-frequency output condition met, thereby allowing the first speaker to play a low-frequency signal or a low-medium frequency signal; or, other device characteristics of the first speaker of the earphone may be adjusted, which is not limited in the embodiments of the present disclosure. It should be noted that a signal with a frequency of less than 1 KHz is referred to as a low-frequency signal, and a signal with a frequency of between 1 KHz and 6 KHz is referred to as a mid-frequency signal, which is only intended to exemplify the low-frequency signal, the mid-frequency signal, and the range of low-frequency band in the embodiments of the present disclosure, and is not a limitation of the embodiments of the present disclosure. In some embodiments, the first speaker may be a bass speaker, and the first speaker may be any one of an electrically operated speaker, an electrostatic speaker, an electromagnetic speaker, and a piezoelectric speaker.

In the embodiments, the low-frequency output circuit of the audio playback device plays the low-frequency portion of the noise canceling signal through the device characteristics of the first speaker, and the device characteristics of the first speaker can enable the first speaker to meet the preset low-frequency output condition, such that the low-frequency portion of the noise canceling signal can be played through the device characteristics of the first speaker, and there is no need to design other filters in the audio playback device, which simplifies the circuit cost of the audio playback device. In addition, playing the low-frequency portion of the noise canceling signal through the device characteristics of the first speaker may avoid noise replay of the high-frequency signal in the non-noise reduction frequency band.

Figure 5:
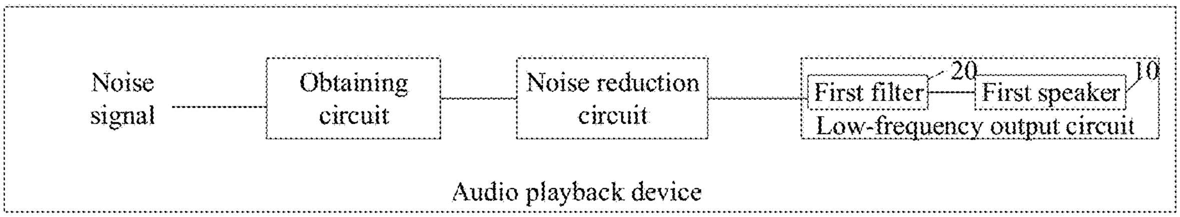
FIG. 5 is a schematic view of an audio playback device according to an embodiment of the present disclosure.

In some embodiments, as illustrated in FIG. 5, the low-frequency output circuit further includes: a first filter 20 configured to obtain the low-frequency portion of the noise canceling signal by filtering the noise canceling signal.

In the embodiments, the first filter 20 of the low-frequency output circuit first filters the noise canceling signal to obtain the low-frequency portion of the noise canceling signal, and then plays the low-frequency portion of the noise canceling signal through the first speaker 10. In some embodiments, the low-frequency portion of the noise canceling signal obtained by filtering the noise canceling signal by the first filter 20 may be a signal with a frequency of less than 1 KHz in the noise canceling signal. In some embodiments, the first speaker may be a bass speaker, and the first speaker may be any one of an electrically operated speaker, an electrostatic speaker, an electromagnetic speaker, and a piezoelectric speaker.

In the embodiments, the first filter in the low-frequency output circuit filters the noise canceling signal to obtain the low-frequency portion of the noise canceling signal, and the low-frequency portion of the noise canceling signal is directly played through the first speaker, which is a relatively simple process to realize. In addition, the first filter filters the noise canceling signal to obtain the low-frequency portion of the noise canceling signal, and the same low-frequency portion of the noise canceling signal is played through the first speaker, such that the noise replay of a high-frequency signal in a non-noise reduction frequency band is avoided.

Figure 6:
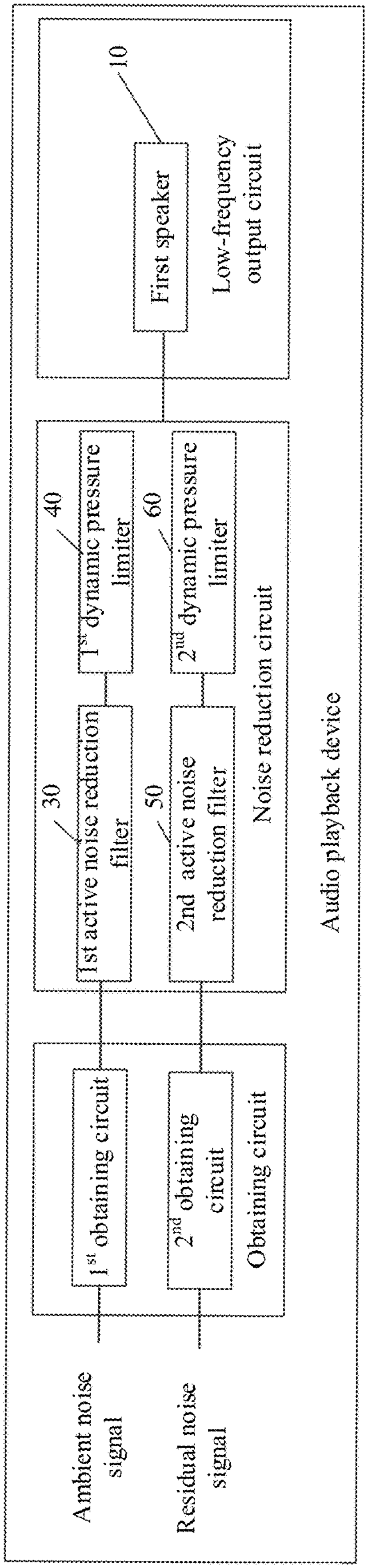
FIG. 6 is a schematic view of an audio playback device according to an embodiment of the present disclosure.

As in the foregoing description of the scenarios, taking the audio playback device as a feedforward earphone and a hybrid earphone as an example, the noise signal obtained by the obtaining circuit may include an ambient noise signal. In some embodiments, as illustrated in FIG. 6, the obtaining circuit includes a first obtaining circuit configured to obtain an ambient noise signal, and the noise reduction circuit is configured to obtain the noise canceling signal by performing a noise reduction process on the ambient noise signal.

In the embodiments, the audio playback device performs the noise reduction process on the obtained ambient noise signal to obtain the noise canceling signal. In some embodiments, the noise reduction process performed by the audio playback device on the noise signal may be to directly generate a sound wave with the same amplitude and frequency and opposite phase as the ambient noise signal to obtain the noise canceling signal, or to invert the ambient noise signal to obtain the noise canceling signal.

In the embodiments, the first obtaining circuit of the obtaining circuit obtains the ambient noise signal, and the noise reduction circuit performs the noise reduction process on the obtained ambient noise signal to obtain the noise canceling signal, through which the ambient noise signal may be cancelled out, thereby improving the noise reduction effect of the audio playback device, and ensuring the sound quality of the played audio signal.

In a scenario in which the noise reduction circuit performs the noise reduction process on the ambient noise signal to obtain the noise canceling signal, the noise reduction circuit may include a first active noise reduction filter and a first dynamic voltage limiter. In some embodiments, continuing to refer to FIG. 6, the noise reduction circuit includes a first active noise reduction filter 30 and a first dynamic pressure limiter 40; the first active noise reduction filter 30 is configured to obtain an inverted ambient noise signal by inverting the ambient noise signal; and the first dynamic pressure limiter 40 is configured to obtain a corresponding noise canceling signal of the ambient noise signal by compressing an amplitude of the inverted ambient noise signal within a preset first amplitude range.

In the embodiments, the noise canceling circuit includes the first active noise reduction filter 30 and the first dynamic pressure limiter 40, where the first active noise reduction filter 30 generates an inverted ambient noise signal with the same amplitude and frequency and opposite phase as the ambient noise signal according to the ambient noise signal obtained by the first obtaining circuit; the first dynamic pressure limiter 40 compresses an amplitude of the inverted ambient noise signal obtained by the first active noise reduction filter to within the preset first amplitude range, for obtaining the noise canceling signal corresponding to the ambient noise signal. It is to be noted that when the inverted ambient noise signal obtained by the first active noise reduction filter is not very large in amplitude, the audio playback device may output according to the original setting; however, when the inverted ambient noise signal obtained by the first active noise reduction filter is too large in amplitude, in order to protect the speaker, the first dynamic pressure limiter 40 may compress the amplitude of the inverted ambient noise signal to within a range. The first dynamic pressure limiter 40 does not function when the inverted ambient noise signal obtained by the first active noise reduction filter is very small in amplitude, and the first dynamic pressure limiter 40 operates only when the power of the inverted ambient noise signal obtained by the first active noise reduction filter exceeds a preset threshold of the first dynamic pressure limiter 40.

In the embodiments, the first active noise reduction filter included in the noise reduction circuit inverts the ambient noise signal to obtain the inverted ambient noise signal, and the amplitude of the inverted ambient noise signal is compressed to within the preset first amplitude range by the first dynamic pressure limiter, for obtaining the noise canceling signal corresponding to the ambient noise signal, so as to ensure that the amplitude of the noise canceling signal corresponding to the ambient noise signal played by the speaker is limited to a safe range for playback by the speaker.

As in the foregoing description of the scenarios, taking the audio playback device as a hybrid earphone as an example, the noise signal obtained by the obtaining circuit further includes a residual noise signal. In some embodiments, continuing to refer to FIG. 6, the obtaining circuit further includes a second obtaining circuit configured to obtaining a residual noise signal, and the noise reduction circuit is configured to obtain the noise canceling signal by performing a noise reduction process on the ambient noise signal and the residual noise signal.

In the embodiments, the second obtaining circuit included in the obtaining circuit is configured to obtain the residual noise signal, and the noise reduction circuit is configured to perform the noise reduction process on the ambient noise signal and the residual noise signal to obtain the noise canceling signal. In some embodiments, the noise reduction circuit may perform the noise reduction process on the ambient noise signal and the residual noise signal separately, for example, inverting the ambient noise signal to obtain a noise canceling signal with an opposite phase as the ambient noise signal, and inverting the residual noise signal to obtain a noise canceling signal with an opposite phase as the residual noise signal.

In the embodiments, the second obtaining circuit included in the obtaining circuit obtains the residual noise signal, and the noise reduction circuit performs the noise reduction process on the ambient noise signal and the residual noise signal to obtain the noise canceling signal, through which both the ambient noise signal from the outside and the residual noise signal in the ear canal may be cancelled out, thereby further reducing the noise floor of the audio playback device.

In a scenario in which the noise reduction circuit performs the noise reduction process on the ambient noise signal and the residual noise signal to obtain the noise canceling signal, the noise reduction circuit further includes a second active noise reduction filter and a second dynamic voltage limiter. In some embodiments, continuing to refer to FIG. 6, the noise reduction circuit further includes a second active noise reduction filter 50 and a second dynamic pressure limiter 60; the second active noise reduction filter 50 is configured to obtain an inverted residual noise signal by inverting the residual noise signal; the second dynamic pressure limiter 60 is configured to obtain a corresponding noise canceling signal of the residual noise signal by compressing an amplitude of the inverted residual noise signal within a preset second amplitude range.

In the embodiments, the noise reduction circuit further includes the second active noise reduction filter 50 and the second dynamic pressure limiter 60, where the second active noise reduction filter 50 generates an inverted residual noise signal with the same amplitude and frequency and opposite phase as the residual noise signal according to the residual noise signal obtained by the second obtaining circuit; the second dynamic pressure limiter 60 compresses an amplitude of the inverted residual noise signal obtained by the second active noise reduction filter to within the preset second amplitude range, for obtaining the noise canceling signal corresponding to the residual noise signal. It is to be noted that when the inverted residual noise signal obtained by the second active noise reduction filter 50 is not very large in amplitude, the audio playback device may output according to the original setting; however, when the inverted residual noise signal obtained by the second active noise reduction filter 50 is too large in amplitude, in order to protect the speaker, the second dynamic limiter 60 may compress the amplitude of the obtained inverted residual noise signal to within a range. The second dynamic pressure limiter 60 does not function when the inverted residual noise signal obtained by the second active noise reduction filter is very small in amplitude, and the second dynamic pressure limiter 60 operates only when the power of the inverted residual noise signal obtained by the second active noise reduction filter exceeds a preset threshold of the second dynamic pressure limiter 60.

In the embodiments, the second active noise reduction filter included in the noise reduction circuit inverts the residual noise signal to obtain an inverted residual noise signal, and the amplitude of the inverted residual noise signal is compressed to within the preset first amplitude range by the second dynamic pressure limiter, for obtaining the noise canceling signal corresponding to the residual noise signal, so as to ensure that the amplitude of the noise canceling signal corresponding to the residual noise signal played by the speaker is limited to a safe range for playback by the speaker.

Figure 7:
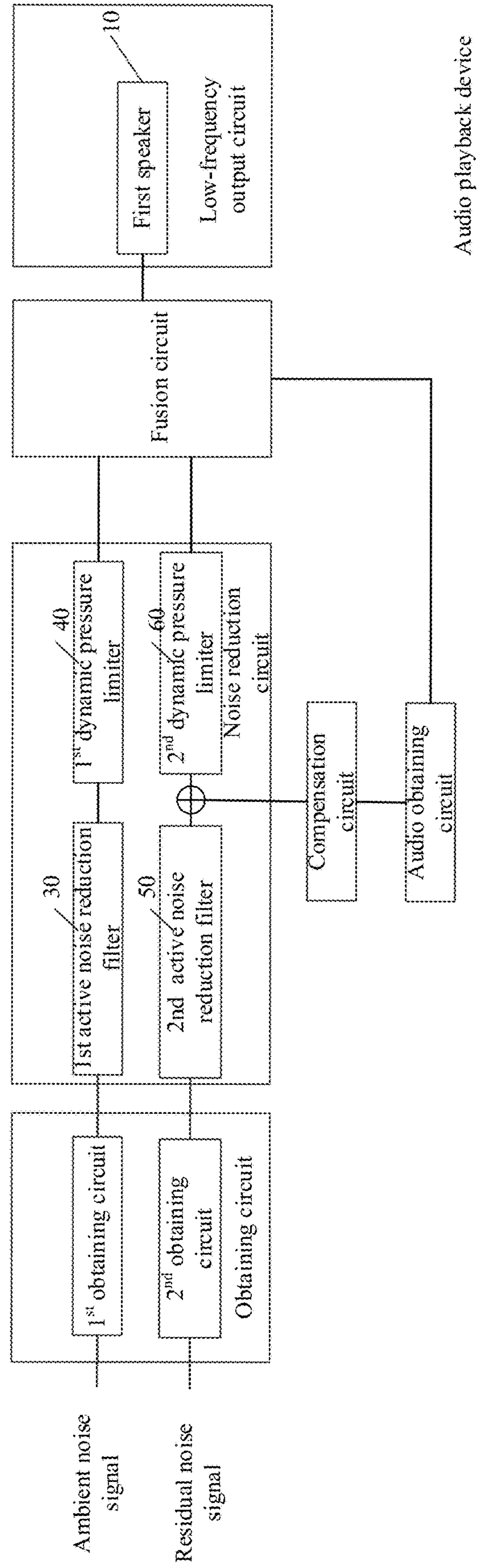
FIG. 7 is a schematic view of an audio playback device according to an embodiment of the present disclosure.

In most scenarios, the audio playback device is required to play the audio signal, and when the audio playback device has an audio signal to be played, the audio playback device may fuse the audio signal to be played and the noise canceling signal to obtain a fused audio signal, and play a low-frequency portion of the fused audio signal through the low-frequency output circuit. In some embodiments, as illustrated in FIG. 7, the audio playback device further includes an audio obtaining circuit and a fusion circuit, the audio obtaining circuit being configured to obtain an audio signal to be played, and the fusion circuit being configured to obtain a fused audio signal by fusing the audio signal to be played with the noise canceling signal; and the low-frequency output circuit is configured to play a low-frequency portion of the fused audio signal through the first speaker 10.

In the embodiments, the audio signal to be played is obtained through the audio obtaining circuit of the audio playback device, the fusion circuit of the audio playback device fuses the audio signal to be played with the noise canceling signal to obtain the fused audio signal, and the low-frequency output circuit plays the low-frequency portion of the fused audio signal through the first speaker 10. In some embodiments, the audio signal to be played may be pre-stored in a memory of the audio playback device, or may be obtained from another external audio device, for example, the external audio device may be a speaker, a mobile phone, a television, a computer, a sound card, etc. In some embodiments, the audio signal to be played may be a music signal, a voice signal, other audio signals, etc., and the present embodiment is not limited thereto. In some embodiments, the fusion circuit may superimpose the audio signal to be played and the noise canceling signal to obtain the fused audio signal. In some embodiments, the low-frequency output circuit may filter the fused audio signal through the first filter to obtain the low-frequency portion of the fused audio signal, and play the low-frequency portion of the fused audio signal through a second speaker. In some embodiments, the audio playback device may play the low-frequency portion of the converged audio signal through the device characteristics of the first speaker, where the device characteristics of the first speaker cause the first speaker to meet a preset low-frequency output condition. In some embodiments, the preset low-frequency output condition includes that a frequency band of an output signal of the first speaker lies within a range of the preset low-frequency band and that the output signal of the first speaker has characteristics of a high low-frequency amplitude and a flat mid-frequency amplitude. In some embodiments, the low-frequency output condition further includes that an acoustic pressure change amount of the output signal of the first speaker is less than a preset threshold value. In some embodiments, the device characteristics of the first speaker include acoustic resistance characteristics of a horn acoustic aperture tuning network and/or damping characteristics of a diaphragm material of the first speaker. It is to be noted that for a detailed description of the preset low-frequency output condition met by the first speaker and a detailed description of the device characteristics of the first speaker, reference may be made to the description of the above embodiments, and the present embodiments will not be repeated herein.

In the embodiments, when an audio signal to be played exists in the audio playback device, the audio obtaining circuit of the audio playback device obtains the audio signal to be played, the fusion circuit fuses the audio signal to be played with the noise canceling signal to obtain the fused audio signal, and the low-frequency output circuit plays the low-frequency portion of the fused audio signal, so as to take into account the sound quality of the audio signal to be played while noise canceling the noisy signal, thereby ensuring the playback of the high-quality audio signal.

In the scenario in which the audio playback device exists to be played, the residual noise signal in the ear canal is obtained while the audio signal played by the audio playback device is obtained, and the obtained audio signal played by the audio playback device also becomes noise. Therefore, noise reduction on this portion of the noise is required. In some embodiments, continuing to refer to FIG. 7, the audio playback device further includes a compensation circuit; the obtaining circuit is further configured to obtain an audio signal in an ear canal; the compensation circuit is configured to obtain the audio signal to be played from the audio obtaining circuit and transmit the audio signal to be played to the noise reduction circuit; the noise reduction circuit is further configured to obtain an inverted audio signal by inverting the audio signal in the ear canal, and to superimpose the audio signal to be played with the inverted audio signal to eliminate the audio signal in the ear canal.

In some embodiments, the obtaining circuit may be a microphone in the audio playback device near the ear canal. In some embodiments, the audio signal in the ear canal may be a music signal, a voice signal, etc., and the present embodiments are not limited thereto herein. The inverted audio signal of the audio signal in the ear canal refers to a signal that has an opposite phase as the obtained audio signal in the ear canal. In the embodiments, the noise reduction circuit may invert the audio signal in the ear canal to obtain the inverted audio signal. In some embodiments, the noise reduction circuit may invert the audio signal in the ear canal by means of an active noise reduction filter to obtain the inverted audio signal, or may generate the inverted audio signal according to characteristics of the audio signal in the ear canal such as frequency and amplitude change. The compensation circuit obtains the audio signal to be played from the audio obtaining circuit and transmits the audio signal to be played to the noise reduction circuit, and the noise reduction circuit superimposes the audio signal to be played and the inverted audio signal in order to eliminate the obtained audio signal in the ear canal. It is to be understood that the above inverted audio signal is an audio signal having a phase opposite to that of the audio signal to be played. Therefore, by superimposing the audio signal to be played with the inverted audio signal, the audio signal in the ear canal can be eliminated.

In the embodiments, the obtaining circuit of the audio playback device may obtain the audio signal in the ear canal, the compensation circuit may obtain the audio signal to be played from the audio obtaining circuit and transmit the audio signal to be played to the noise reduction circuit, the noise reduction circuit may invert the obtained audio signal in the ear canal to obtain the inverted audio signal, and the audio signal to be played can be eliminated by superimposing the audio signal to be played and the inverted audio signal, thereby ensuring the sound quality of the played audio signal.

Figure 8:
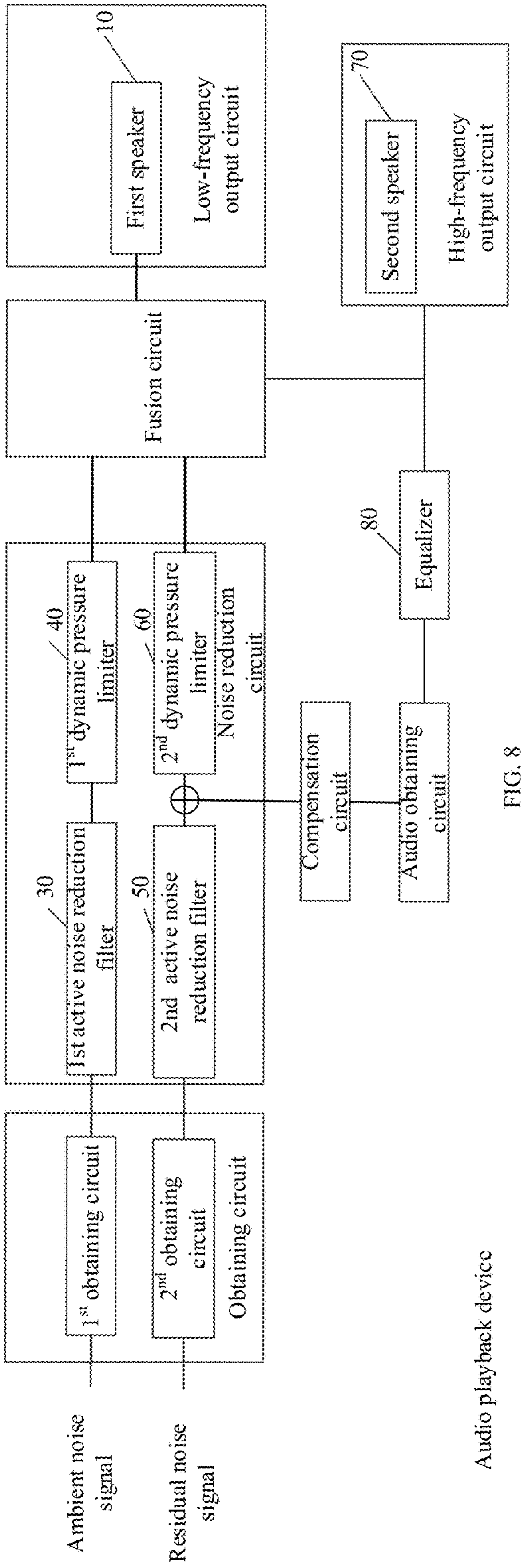
FIG. 8 is a schematic view of an audio playback device according to an embodiment of the present disclosure.

In the scenario in which the low-frequency portion of the fused audio signal is played through the low-frequency output circuit, a high-frequency portion of the audio signal to be played may also be played in order to ensure the integrity of the audio signal. On the basis of the above embodiments, in some embodiments, as illustrated in FIG. 8, the audio playback device further includes: a high-frequency output circuit, the high-frequency output circuit including a second speaker 70; the high-frequency output circuit is configured to play the high-frequency portion of the audio signal to be played through the second speaker 70.

In the embodiments, the audio playback device further includes the high-frequency output circuit for playing the high-frequency portion of the audio signal to be played, the high-frequency output circuit including the second speaker 70. Generally, a signal with a frequency between 6 KHz and 20 KHz may be referred to as a high-frequency signal. In the embodiments, the high-frequency portion of the audio signal to be played that is played by the high-frequency output circuit through the second speaker 70 may be a portion of the audio signal to be played with a frequency between 6 KHz and 20 KHz. It should be noted that naming the signal with a frequency between 6 KHz-20 KHz as the high-frequency signal is to exemplify the signal of the high-frequency portion of the audio signal to be played in the embodiments, and the division of the high-frequency signal in the embodiments of the present disclosure is not limited thereto.

In some embodiments, the high-frequency output circuit plays the high-frequency portion of the audio signal to be played, either through a tweeter included in the high-frequency output circuit to play the high-frequency portion of the audio signal to be played, or through the high-frequency output circuit to filter the audio signal to be played to obtain the high-frequency portion of the audio signal to be played, and then to play the high-frequency portion of the audio signal to be played. The following will explain these two cases in detail.

In a first case, the high-frequency output circuit is configured to play the high-frequency portion of the audio signal to be played through device characteristics of the second speaker 70, and the device characteristics of the second speaker 70 cause the second speaker 70 to meet a preset high-frequency output condition.

In some embodiments, the high-frequency output condition includes that a frequency band of an output signal of the second speaker 70 lies within a preset high-frequency band, and generally, a signal with a signal frequency between 6 KHz and 20 KHz is referred to as a high-frequency signal. In some embodiments, the device characteristics of the second speaker 70 include at least one of a type of diaphragm material, a Young's modulus of the diaphragm material, damping characteristics of the diaphragm material, a mass of a vibration system of the speaker, and a coil size of the speaker. In the case of the earphone, for example, the type of the diaphragm material of the second speaker of the earphone may be adjusted to make the preset high-frequency output condition met, so as to allow the second speaker to play the high-frequency signal of the audio signal to be played; or, the Young's modulus of the diaphragm material of the second speaker of the earphone may be adjusted to make the preset high-frequency output condition met, so as to allow the second speaker to play the high-frequency signal of the audio signal to be played; or, the damping characteristics of the diaphragm material of the second speaker of the earphone may be adjusted to make the preset high-frequency output condition met, so as to allow the second speaker to play the high-frequency signal of the audio signal to be played; or, the mass of the vibration system of the second speaker of the earphone may be adjusted s to make the preset high-frequency output condition met, so as to allow the second speaker to play the high-frequency signal of the audio signal to be played; or, the coil size of the second speaker of the earphone may be adjusted to make the preset high-frequency output condition met, so as to allow the second speaker to play the high-frequency signal of the audio signal to be played; or, other device characteristics of the second speaker of the earphone may be adjusted, without being limited in the embodiments of the present disclosure.

In some embodiments, an acoustic pressure of an output signal of the second speaker 70 is higher than an acoustic pressure of the output signal of the first speaker 10. That is, a change amount of the atmospheric pressure generated after being perturbed by the output signal of the second speaker 70 is greater than a change amount of the atmospheric pressure generated after being perturbed by the output signal of the first speaker. In some embodiments, the second speaker 70 may be a tweeter. In some embodiments, the second speaker 70 may be any one of an electrically operated speaker, an electrostatic speaker, an electromagnetic speaker, and a piezoelectric speaker.

In a second case, the high-frequency output circuit further includes a second filter configured to filter the audio signal to be played to obtain a high-frequency portion of the audio signal to be played.

In the embodiments, the high-frequency output circuit filters the audio signal to be played through the second filter to obtain the high-frequency portion of the audio signal to be played, and plays the high-frequency portion of the audio signal to be played through the second speaker of the high-frequency output circuit. In some embodiments, the high-frequency portion of the audio signal to be played obtained by filtering the audio signal to be played by the audio playback device may be a signal with a frequency between 6 KHz and 20 KHz in the audio signal to be played.

In the embodiments, the high-frequency output circuit is capable of playing the high-frequency portion of the audio signal to be played. By playing the low-frequency portion of the audio signal to be played separately from the high-frequency portion of the audio signal to be played, the high-frequency portion of the audio signal to be played, played by the audio playback device, does not have the noise of high-frequency signals of the non-noise reduction frequency band, thereby ensuring the sound quality of playback of the audio signal to be played; furthermore, playing the high-frequency portion of the audio signal to be played through the second speaker of the audio playback device ensures the integrity of the audio signal to be played.

In a scenario where the audio signal to be played exists within the above audio playback device, a gain value of the audio signal to be played may be adjusted. In some embodiments, continuing to refer to FIG. 8, the audio playback device further includes an equalizer 80 configured to adjust a gain of the audio signal to be played.

In the embodiments, the audio playback device further includes an equalizer 80, and the equalizer 80 may further adjust the gain of the audio signal to be played before playing the audio signal to be played. It is to be understood that by adjusting the gain of the audio signal to be played, the sound quality of the playback of the audio signal to be played can be improved by adjusting the electrical signals of various different frequencies.

Figure 9:
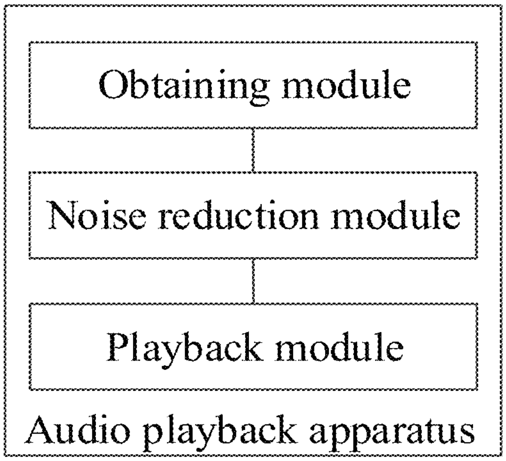
FIG. 9 is a structural schematic view of an audio playback apparatus according to an embodiment of the present disclosure.

In some embodiments, as illustrated in FIG. 9, provided is an audio playback apparatus including: an obtaining module, a noise reduction module, and a playback module.

The first obtaining module is configured to obtain a noise signal.

The noise reduction module is configured to obtain a noise canceling signal by performing a noise reduction process on the noise signal.

The first playback module is configured to play a low-frequency portion of the noise canceling signal through a first speaker.

The audio playback apparatus provided in the present embodiments can perform the present method embodiments, the realization principles and technical effects of which are similar and will not be repeated herein.

On the basis of the above embodiments, in some embodiments, the first playback module may include a first playback unit.

The first playback unit is configured to obtain the low-frequency portion of the noise canceling signal by filtering the noise canceling signal, and play the low-frequency portion of the noise canceling signal through the first speaker; or The low-frequency portion of the noise canceling signal is played through device characteristics of the first speaker, where the device characteristics of the first speaker are configured to cause the first speaker to meet a preset low-frequency output condition.

In some embodiments, the low-frequency output condition includes that a frequency band of an output signal of the first speaker lies within a preset low-frequency band, and that the output signal of the first speaker has a characteristic of a high low-frequency amplitude and a flat mid-frequency amplitude.

In some embodiments, the low-frequency output condition further includes that an acoustic pressure change amount of the output signal of the first speaker is less than a preset threshold value.

In some embodiments, the device characteristics of the first speaker include acoustic resistance characteristics of a horn acoustic aperture tuning network and/or damping characteristics of a diaphragm material of the first speaker.

The audio playback apparatus in the embodiments may perform the above method embodiments, the realization principles and technical effects of which are similar and will not be repeated herein.

On the basis of the above embodiments, in some embodiments, the noise signal includes an ambient noise signal, and the noise reduction module includes: a noise reduction unit.

The noise reduction unit is configured to obtain the noise canceling signal by performing a noise reduction process on the ambient noise signal.

The audio playback apparatus in the embodiments can perform the above method embodiments, the realization principles and technical effects of which are similar and will not be repeated herein.

On the basis of the above embodiment, in some embodiments, the noise signal further includes a residual noise signal, and the noise reduction unit is configured to obtain the noise canceling signal by performing a noise reduction process on the ambient noise signal and the residual noise signal.

The audio playback apparatus in the embodiments can perform the above method embodiments, the realization principles and technical effects of which are similar and will not be repeated herein.

On the basis of the above embodiment, in some embodiments, the apparatus further includes a second obtaining module, a fusion module, and a second playback module.

The second obtaining module is configured to obtain an audio signal to be played.

The fusion module is configured to obtain a fused audio signal by fusing the audio signal to be played with the noise canceling signal.

The second playback module is configured to play a low frequency portion of the fused audio signal through the first speaker.

The audio playback apparatus provided in the present embodiment can perform the above method embodiments, the realization principles and technical effects of which are similar and will not be repeated herein.

The audio playback apparatus in the embodiments can perform the above method embodiments, the realization principles and technical effects of which are similar and will not be repeated herein.

On the basis of the above embodiments, in some embodiments, the apparatus further includes: an adjustment module.

The adjustment module is configured to perform a gain adjustment on the audio signal to be played.

The audio playback apparatus in the embodiments can perform the above method embodiments, the realization principles and technical effects of which are similar and will not be repeated herein.

On the basis of the above embodiments, in some embodiments, the apparatus further includes: a third playback module.

The third playback module is configured to play the high-frequency portion of the audio signal to be played through the second speaker.

The audio playback apparatus in the embodiments can perform the above method embodiments, the realization principles and technical effects of which are similar and will not be repeated herein.

On the basis of the above embodiments, in some embodiments, the third playback module includes: a second playback unit.

The second playback unit is configured to obtain the high-frequency portion of the audio signal to be played by filtering the audio signal to be played, and play the high-frequency portion of the audio signal to be played through the second speaker; or The high-frequency portion of the audio signal to be played is played through device characteristics of the second speaker, where the device characteristics of the second speaker are configured to cause the second speaker to meet a preset high-frequency output condition.

In some embodiments, the high-frequency output condition includes that a frequency band of an output signal of the second speaker lies within a preset high-frequency band.

In some embodiments, the device characteristics of the second speaker include at least one of a type of diaphragm material, a Young's modulus of the diaphragm material, damping characteristics of the diaphragm material, a mass of a vibration system of the speaker, and a coil size of the speaker.

In some embodiments, an acoustic pressure of the output signal of the second speaker is higher than an acoustic pressure of the output signal of the first speaker.

The audio playback apparatus in the embodiments can perform the above method embodiments, the realization principles and technical effects of which are similar and will not be repeated herein.

Specific limitations regarding the audio playback apparatus can be found in the above limitations for the audio playback method, and will not be repeated herein. Each module in the audio playback apparatus may be realized in whole or in part by software, hardware, and combinations thereof. Each of the modules may be embedded in or independent of a processor in the computer device in the form of hardware, or may be stored in a memory in the computer device in the form of software, so as to facilitate the processor to call for the execution of the operations corresponding to each of the above modules.

In some embodiments, provided is an audio playback device including a memory and a processor, the memory storing a computer program, the processor realizing the following steps when executing the computer program.

Obtaining a noise signal.

Obtaining a noise canceling signal by performing a noise reduction process on the noise signal.

Playing a low-frequency portion of the noise canceling signal through a first speaker.

In some embodiments, a computer-readable storage medium is provided with a computer program stored thereon, the computer program realizing the following steps when executed by a processor.

Obtaining a noise signal.

Obtaining a noise canceling signal by performing a noise reduction process on the noise signal.

Playing a low-frequency portion of the noise canceling signal through a first speaker.

The various technical features of the above embodiments may be combined in any combination, and all possible combinations of the various technical features of the above embodiments have not been described for the sake of conciseness of description; however, as long as the combinations of these technical features are not contradictory, they should be considered to be within the scope of the present disclosure.

The above embodiments express only several implementations of the present disclosure, which are described in a more specific and detailed manner, but are not to be construed as a limitation on the scope of the present disclosure. It should be pointed out that, for a person skilled in the art, a number of deformations and improvements can be made without departing from the conception of the present disclosure, all of which fall within the scope of the present disclosure. Therefore, the scope of the present disclosure shall be subject to the attached claims.

What is claimed is:

1. An audio playback method, comprising:

obtaining a noise signal;

obtaining a noise canceling signal by performing a noise reduction process on the noise signal; and playing a low-frequency portion of the noise canceling signal through a first speaker;

wherein the playing a low-frequency portion of the noise canceling signal through a first speaker comprises:

obtaining the low-frequency portion of the noise canceling signal by filtering the noise canceling signal, and playing the low-frequency portion of the noise canceling signal through the first speaker; or playing the low-frequency portion of the noise canceling signal through device characteristics of the first speaker, wherein the device characteristics of the first speaker are configured to cause the first speaker to meet a preset low-frequency output condition;

wherein the device characteristics of the first speaker comprise acoustic resistance characteristics of a horn acoustic aperture tuning network and/or damping characteristics of a diaphragm material of the first speaker.

2. The method according to claim 1, in response to an audio signal to be played existing, further comprising:

obtaining the audio signal to be played;

obtaining a fused audio signal by fusing the audio signal to be played with the noise canceling signal; and playing a low frequency portion of the fused audio signal through the first speaker.

3. The method according to claim 2, further comprising:

playing a high-frequency portion of the audio signal to be played through a second speaker.

4. The method according to claim 3, wherein the playing a high-frequency portion of the audio signal to be played through a second speaker comprises:

obtaining the high-frequency portion of the audio signal to be played by filtering the audio signal to be played, and playing the high-frequency portion of the audio signal to be played through the second speaker; or playing the high-frequency portion of the audio signal to be played through device characteristics of the second speaker, wherein the device characteristics of the second speaker are configured to cause the second speaker to meet a preset high-frequency output condition.

5. The method according to claim 4, wherein the high-frequency output condition comprises that a frequency band of an output signal of the second speaker lies within a preset high-frequency band.

6. The method according to claim 4, wherein the device characteristics of the second speaker comprise at least one of a type of a diaphragm material, a Young's modulus of the diaphragm material, damping characteristics of the diaphragm material, a mass of a vibration system of the speaker, and a coil size of the speaker.

7. The method according to claim 3, wherein an acoustic pressure of the output signal of the second speaker is higher than an acoustic pressure of an output signal of the first speaker.

8. The method according to claim 1, wherein the low-frequency output condition comprises that a frequency band of an output signal of the first speaker lies within a preset low-frequency band, and that the output signal of the first speaker has a characteristic of a high low-frequency amplitude and a flat mid-frequency amplitude.

9. The method according to claim 8, wherein the low-frequency output condition further comprises that an acoustic pressure change amount of the output signal of the first speaker is less than a preset threshold value.

10. An audio playback device, comprising a first speaker, a processor, and a memory; wherein the memory is configured to store a computer program, and the processor is configured to call and run the computer program stored in the memory to perform:

obtaining a noise signal;

obtaining a noise canceling signal by performing a noise reduction process on the noise signal; and playing a low-frequency portion of the noise canceling signal through a first speaker;

wherein the playing a low-frequency portion of the noise canceling signal through a first speaker comprises:

obtaining the low-frequency portion of the noise canceling signal by filtering the noise canceling signal, and playing the low-frequency portion of the noise canceling signal through the first speaker; or playing the low-frequency portion of the noise canceling signal through device characteristics of the first speaker, wherein the device characteristics of the first speaker are configured to cause the first speaker to meet a preset low-frequency output condition;

wherein the device characteristics of the first speaker comprise acoustic resistance characteristics of a horn acoustic aperture tuning network and/or damping characteristics of a diaphragm material of the first speaker.

11. The audio playback device according to claim 10, in response to an audio signal to be played existing, further comprising:

obtaining the audio signal to be played;

obtaining a fused audio signal by fusing the audio signal to be played with the noise canceling signal; and playing a low frequency portion of the fused audio signal through the first speaker.

12. The audio playback device according to claim 11, wherein the processor is further configured to perform:

playing a high-frequency portion of the audio signal to be played through a second speaker.

13. The audio playback device according to claim 12, wherein the playing a high-frequency portion of the audio signal to be played through a second speaker comprises:

obtaining the high-frequency portion of the audio signal to be played by filtering the audio signal to be played, and playing the high-frequency portion of the audio signal to be played through the second speaker; or playing the high-frequency portion of the audio signal to be played through device characteristics of the second speaker, wherein the device characteristics of the second speaker are configured to cause the second speaker to meet a preset high-frequency output condition.

14. The audio playback device according to claim 10, wherein the low-frequency output condition comprises that a frequency band of an output signal of the first speaker lies within a preset low-frequency band, and that the output signal of the first speaker has a characteristic of a high low-frequency amplitude and a flat mid-frequency amplitude.

15. The audio playback device according to claim 14, wherein the low-frequency output condition further comprises that an acoustic pressure change amount of the output signal of the first speaker is less than a preset threshold value.

16. A non-transitory computer-readable storage medium, storing an instruction; wherein the instruction is executable by a processor to perform:

obtaining a noise signal;

obtaining a noise canceling signal by performing a noise reduction process on the noise signal; and playing a low-frequency portion of the noise canceling signal through a first speaker;

wherein the playing a low-frequency portion of the noise canceling signal through a first speaker comprises:

obtaining the low-frequency portion of the noise canceling signal by filtering the noise canceling signal, and playing the low-frequency portion of the noise canceling signal through the first speaker; or playing the low-frequency portion of the noise canceling signal through device characteristics of the first speaker, wherein the device characteristics of the first speaker are configured to cause the first speaker to meet a preset low-frequency output condition;

wherein the device characteristics of the first speaker comprise acoustic resistance characteristics of a horn acoustic aperture tuning network and/or damping characteristics of a diaphragm material of the first speaker.

* * * * *